Patented Apr. 11, 1939

2,153,961

UNITED STATES PATENT OFFICE 2,153,961

NONCORROSIVE ALCOHOL ANTIFREEZE LIQUID

Headlee Lamprey, Kenmore, N. Y., assignor to Carbide and Carbon Chemicals Corporation, a corporation of New York No Drawing. Application August 6, 1937, Serial No. 157,732

11 Claims. (Cl. 252—5)

The invention relates to alcohol antifreeze liquids which are noncorrosive to metals when used as a cooling fluid in internal combustion engines. It is particularly concerned with improved corrosion inhibitors for use with cooling fluids containing an alcohol as the freezing point depressant.

Alcohols of quite general use as a freezing point depressant in antifreeze liquids include monohydric and polyhydric compounds, such as methanol, ethanol, propanol, the glycols and polyglycols, and glycerol. The present invention is particularly concerned with cooling fluids made from the monohydric alcohols but in its broadest scope is also operable with ethylene glycol and other glycols. These alcohols are not inherently corrosive toward metals but in dilution with water to form cooling fluids, and under conditions encountered in normal use in an automobile cooling system, solutions of the alcohols usually become definitely corrosive to metals of the cooling system, unless steps are taken to prevent induced corrosive action. The most common manner of protecting metals in contact with the cooling fluid consists in adding to the alcohol minor quantities of one or more inhibitor agents, and numerous materials have heretofore been proposed for this purpose. There has been difficulty, however, in obtaining by this means satisfactory protection for all metals of a cooling system, which usually includes in its structure iron, brass, copper, solder and aluminum, and even mixtures of a plurality of inhibitor materials are quite often deficient in their protective action toward one or more of these metals.

In accordance with my invention I have found a single compound which functions to adequately protect all five metals of a cooling system when present in very small amounts in the alcohol cooling solution. This compound consists of a soluble chlorate salt, particularly an alkali metal chlorate, and a satisfactory inhibiting action is provided when the salt is present in amounts of about 0.10% to 1.00% by weight of the alcohol. Sodium chlorate has, given especially good protective action when used in monohydric alcohols, such as methanol or ethanol, in amounts of about 0.3% to 0.5% by weight of the alcohol.

While the chlorate alone will provide adequate corrosion protection in normal uses of the cooling fluid, and is for the purpose of this invention the essential inhibitor agent, there can also be added, if desired, other known inhibitor materials in mixture with the chlorate salt. This may include for example an oil, which is known to improve anti-leak properties of a cooling fluid, an organic or inorganic base for imparting reserve alkalinity to the solution, or a further specific aluminum inhibitor, such as a soluble nitrate or phosphate. Sodium nitrite has also been used satisfactorily in conjunction with sodium chlorate, and such a mixture may be useful in combating particularly severe corrosive conditions. A specific formula including other inhibitor agents, which has proven especially effective in a cooling fluid containing as the freezing point depressant about 19 parts of ethanol and 1 part of ethylene glycol, consists of 0.5% sodium chlorate, 3.0% mineral oil, 0.01% sodium hydroxide, and 0.2% sodium nitrate. A mixture of 0.3% sodium chlorate and 0.3% sodium nitrite has also given excellent metal protection in a methanol cooling solution.

Many variations in specific formulas including the chlorate will be evident, and may be desirable for different alcohols and various dilutions thereof with water, as they are normally used in a cooling fluid. These modifications are intended to be included where the chlorate salt functions as the primary and essential inhibitor, and the invention should not be limited other than as defined in the appended claims.

I claim:

1. A noncorrosive antifreeze liquid comprising an alcohol as the freezing point depressant and an inhibitor containing as the essential corrosion preventive a soluble chlorate salt in an amount of about 0.10% to 1.00% by weight of the alcohol.

2. A noncorrosive antifreeze liquid comprising an alcohol as the freezing point depressant and an inhibitor containing as the essential corrosion preventive an alkali metal chlorate in an amount of about 0.10% to 1.00% by weight of the alcohol.

3. A noncorrosive antifreeze liquid comprising a monohydric alcohol as the freezing point depressant and an inhibitor containing about 0.1% to 1.00% by weight of the alcohol of sodium chlorate as the essential corrosion preventive.

4. A noncorrosive antifreeze liquid comprising 19 parts of ethanol and 1 part of ethylene glycol as the freezing point depressant, and an inhibitor mixture consisting of sodium chlorate, sodium hydroxide, sodium nitrate, and an oil.

5. A noncorrosive antifreeze liquid comprising 19 parts of ethanol and 1 part of ethylene glycol as the freezing point depressant, and an inhibitor mixture consisting in percentage by weight of the alcohol of 0.5% sodium chlorate, 0.01% sodium hydroxide, 0.2% sodium nitrate, and 3.0% of a mineral oil.

6. A noncorrosive antifreeze liquid comprising methanol and an inhibitor mixture consisting of sodium chlorate and sodium nitrite.

7. A noncorrosive antifreeze liquid comprising methanol and an inhibitor mixture consisting in percentage by weight of the alcohol of 0.3% sodium chlorate and 0.3% sodium nitrite.

8. Method of inhibiting corrosion of metals by an alcohol cooling fluid in contact therewith which comprises contacting said fluid with the metal in the presence of an inhibitor containing as the essential corrosion preventive an alkali metal chlorate in an amount about 0.10% to 1.00% by weight of the alcohol.

9. Method of inhibiting corrosion of metals by a monohydric alcohol cooling fluid in contact therewith which comprises contacting said fluid with the metal in the presence of an inhibitor containing about 0.1% to 1.00% by weight of the alcohol of sodium chlorate as the essential corrosion preventive.

10. Method of inhibiting corrosion of metals by an ethanol cooling fluid in contact therewith which comprises contacting said fluid with the metal in the presence of an inhibitor mixture consisting of sodium chlorate, sodium hydroxide, sodium nitrate, and an oil.

11. Method of inhibiting corrosion of metals in contact with a methanol cooling fluid which comprises contacting said fluid with the metal in the presence of an inhibitor mixture consisting of sodium chlorate and sodium nitrite.

HEADLEE LAMPREY.